Dec. 2, 1969  S. LEHRER  3,481,679
INCANDESCENT LIGHT SOURCE
Filed July 21, 1967
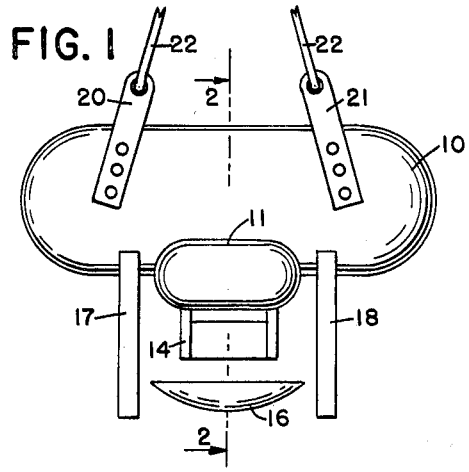
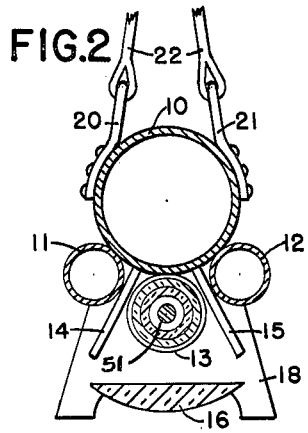
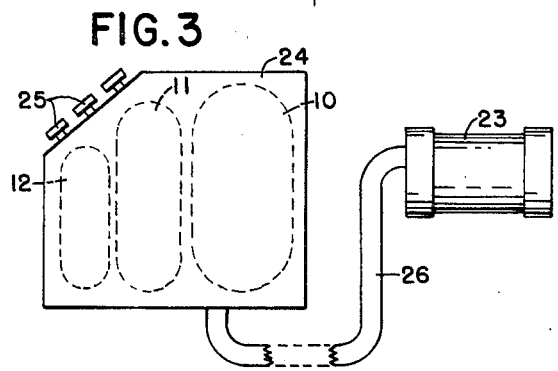
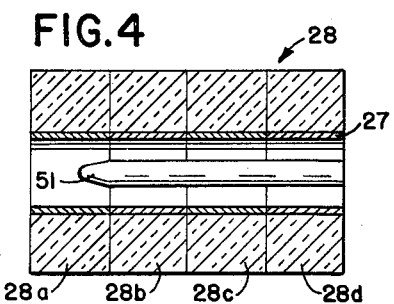
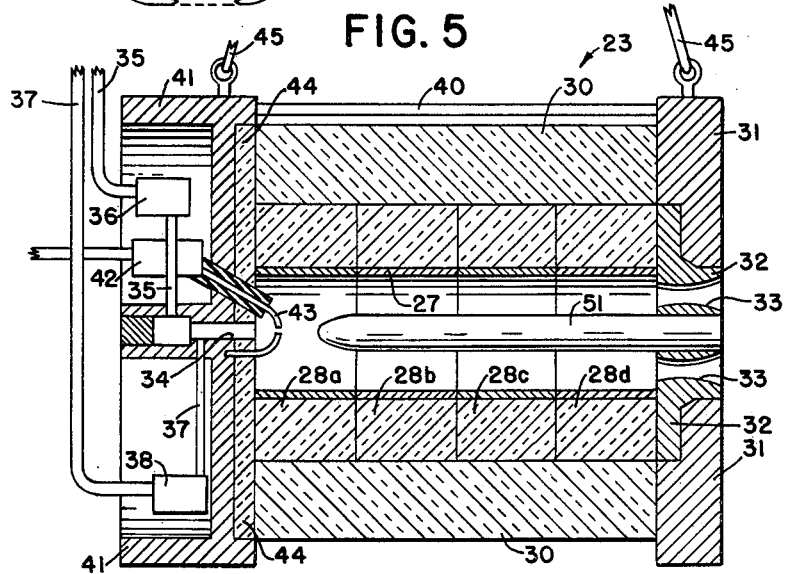
STANLEY LEHRER
INVENTOR
BY *Irving Kayton*
ATTORNEY United States Patent Office 3,481,679
Patented Dec. 2, 1969

3,481,679
INCANDESCENT LIGHT SOURCE
Stanley Lehrer, Pompton Lakes, N.J., assignor to Fairfield Technology Corp., a corporation of Delaware
Filed July 21, 1967, Ser. No. 655,025
Int. Cl. F23r *1/00;* F23d *7/00, 13/00*
U.S. Cl. 43—158                                      14 Claims

ABSTRACT OF THE DISCLOSURE

Combustion temperatures are increased and light output enhanced in a tubular combustion by having the burning gases flow around a rod inside the chamber as the gases pass to an exhaust nozzle. The tubular chamber is formed in segments which are structurally supported by a surrounding and coaxial tube.

BACKGROUND OF THE INVENTION

Field of the invention

This invention relates to a light source for producing intense illumination over a large area by introducing into, and igniting in, an optically transparent, elongated chamber having an exhaust port, a combustible mixture capable of producing sufficient intense heat within the chamber to raise to incandescence certain materials in or on said chamber, or both. More particularly, this invention relates to means for increasing the intensity of the light produced by such an incandescent light source beyond that which has heretofore been possible, and also for extending for a greater period of time than has been thus far possible, the duration of the illumination so produced.

DESCRIPTION OF THE PRIOR ART

In a co-pending application, of common assignee herewith, Ser. No. 548,272, now Patent No. 3,393,967, filed May 6, 1966, by Fleishman and Evans, entitled Light Source, there is described and claimed a light source capable of illuminating large land areas under airborne vehicles and adapted for simple, efficient mounting in and operation from the aircraft. The illumination of interest in that application, and in this, is that porton of the electromagnetic wave spectrum visible to the human eye, i.e., luminous flux, a quantity measured in lumens.

With the exception of lasers, all electromagnetic sources produce significant amounts of invisible radiation. Lasers, on the other hand produce highly focused beams not readily adapted to producing the large land area illumination from aircraft of interest herein. Visible light sources that can illuminate large areas should provide as large a ratio of visible radiation to total radiation produced as possible under the circumstances—and such a ratio is a figure of merit.

Two basic mechanisms exist for producing light. The first is by heating a solid material to an incandescent state, i.e., one in which it will glow with a white light. Such processes are heavily temperature dependent. And, secondly, by applying sufficient energy to an atom or a molecule to cause a transition of its electron or electrons to an energy state higher than its normal, or rest state—this process is not necessarily temperature dependent.

The incandescent mechanism is termed continuous emission because the resulting radiation covers a wide spectral region without interruption, the length and intensity variation of which is a function of the source temperature. The common light bulb is one example of a continuous emitter. The electron excitation mechanism is termed discrete emission because it is confined to a relatively narrow portion of the spectrum. It can be triggered by other electromagnetic radiation (including thermal, i.e., infrared) or by electrical energy as in an arc discharge, e.g., the electrically energized, discretely emitting, xenon arc lamp. The conventional pyrotechnic flare provides light by a combination of these two mechanisms, i.e., discrete emission from thermally activated combustion gas constituents and continuous emission from hot solid particles generated by the combustion process or carried in the gas train or plume.

A light source for use as an aircraft-borne device for large area illumination should advantageously have several basic characteristics. If light is produced in whole or in part by incandescence, the source should be capable of operation at very high temperatures since the higher the temperature the greater the ratio of visible radiation to total radiation produced; moreover this ratio is a monotonic, non-linear, increasing function of temperature (although the ratio in percent cannot exceed 30% no matter how high the temperature because of the narrow range of the visible region compared to the infrared). The source should be self-contained and of reasonably small size for efficient airborne operation and handling. It should be capable of being focused so that application of the illumination to the area of interest may be achieved. It should have a high operating efficiency (a parameter not independent of the preceding factors). Most importantly, it must be capable of safe operation.

The electrical-filament continuous-emitting light bulb, the gas discharge arc lamp and the pyrotechnic flare are prior art that meet some of these requirements in varying degrees, but none achieve all of them.

An analysis of the pyrotechnic flare capability shows that it operates at an average combustion temperature approaching 4000° F. which is somewhat low for light applications; in addition some temperature is lost as the combustion products expand and cool. This light loss is offset somewhat by the resulting large plume surface; but this in turn leads to another disadvantageous feature—the inability to collect and focus any significant fraction of that emission upon the area of interest. In addition the open flame of the flare source makes aircraft carry unsafe during flare operation thereby limiting its tactical use to situations in which parachute suspended light point sources can be effective.

The electric powered xenon arc lamp and the metallic filament bulb provide relatively intense sources of focusable light (temperatures up to 5200° F.). In almost all respects the assets and liabilities of these sources run counter to those of the pyrotechnic flare. The electric lamp is a small source, it is focusable, it is not droppable, and its duration is relatively long compared to the flare. The major disadvantage of the lamp system is its weight and size—the major asset is its intensity and focusability. The electrical light system is thus limited to situations in which a large aircraft can be deployed to carry a rather inefficient system which is not, basically, self-contained.

In order to overcome the drawbacks selectively applicable to the various conventional prior art sources it was necessary to provide a new source which is as hot as a filament source but larger than an electric source, more selfsufficient in operation than the electrical system, safer to carry than an open flame system but as efficient in operation as that system. The Fleishman et al. application describes and claims such a new source. That source comprises an optically transparent chamber or envelope of a material capable of withstanding intense heat over 5000° F., without starting to boil (at pressures above atmospheric pressure) during the requisite operating period of the light source. Fused quartz is an example of such a material. The envelope may be, in one form, a tube or cylinder with a tapered exhaust nozzle at one end for combustion gases to escape. At the other end a fuel and oxidizer capable of producing intense heat, e.g. above 4000° F., is introduced and ignited. As a consequence the combustion products may be heated to incandescense as may the inside wall of the envelope. Moreover materials may be introduced into the combustion chamber, i.e., the envelope, to further increase spectral emissivity in the visible region. Such materials may be discrete emitters; in one form they may be one or more metallic oxides deposited on the inner surface of the combustion chamber.

It may be recognized that in such a light source, not only will light be transmitted through the optically transparent window, but so also will heat, especially infrared radiation. Since the visible to total radiation ratio is a direct function of temperature, other things being equal, it is desirable to reduce this external heat loss relative to the effective visible light output of the source for a given total energy input.

It is an object of the invention, therefore, to enhance visible light output of the Fleishman et al., light source.

Although the Fleishman et al. light source during its operating interval, is at a temperature below the boiling point of the envelope or chamber material, it is not necessarily below its melting point. One embodiment of the Fleishman et al. application provides an outer envelope for structural support. This is additionally useful since the thermal shock which the combustion chamber envelope sustains may lead to cracking of the envelope. The source may remain operative with such cracking because the external envelope holds the internal envelope in place and structurally intact. If, however, the cracking is extensive enough, even the external envelope is inadequate to maintain the structural integrity of the light source, and operation may be disrupted.

It is another object of the invention to maintain operation of the incandescent light under operating conditions that would otherwise produce cracking of the internal envelope sufficient to end effective operation of the source.

SUMMARY OF THE INVENTION

In accordance with the principles of the invention it has been discovered that visible light output may be enhanced by decreasing the internal, transverse cross-sectional area of the combustion chamber. This may be done in the light source by, for example, inserting a rod or pintle into the combustion chamber so as to extend along at least part of the envelope axis parallel to the combustion gas flow. The theory underlying visible light enhancement by this structure of the invention is not completely determined. It is believed, however, in a manner to be explained in greater detail hereinafter, that the decrease in cross-sectional area resulting from insertion of the pintle, which necessarily causes an increase in the combustion gas flow rate per unit cross sectional area through the envelope, results in increasing the surface coefficient of heat transfer along the inside surface of the combustion chamber. As a consequence, heat transfer normal to the surface, i.e., out of the light source, is increased. The inner surface temperature increase thus provided increases the visible to total radiation ratio provided.

The adverse effect of combustion chamber cracking is decreased, in accordane with the principles of the invention by forming the internal chamber or envelope of a plurability of sections rather than one continuous element. Thus where the envelope is a length of quartz tube or a cylinder as in an embodiment in the disclosure of the Fleishman et al. application, it is segmented in accordance with the principles of this invention into two or more sequentially and axially aligned cylinders or tubes which jointly provide the same envelope length. It is believed that axial hoop cracks due to thermal shock that would otherwise be distributed throughout the entire length of the Fleishman et al. envelope, form individualized and different cracking patterns in each of the segments. As a consequence, maintenance of structural integrity of the internal envelope by the external envelope is more often reliably provided.

BRIEF DESCRIPTION OF THE DRAWINGS

For a better understanding of the present invention, together with other and further objects thereof, reference is made to the following description taken in connection with the accompanying drawings. In the drawings:

FIG. 1 is a side view of a lamp housing mounted below fuel and oxidizer tanks;

FIG. 2 is a cross sectional view of the arrangement shown in FIG. 1 and is taken along line 2—2 of that figure;

FIG. 3 is an alternate form showing a tank container and a control unit mounted exterior to the lamp which is connected to the control unit by a long supply cable.

FIG. 4 is a cross sectional view of a portion of the light source envelope showing a segmented envelope with an auxiliary layer of light producing substance, and a rod or pintle inside the combustion chamber envelope.

FIG. 5 is a cross sectional view showing the details of the combustion chamber with the pintle mounting.

DESCRIPTION OF THE PREFERRED EMBODIMENTS

Referring now to the drawings, FIG. 1 shows a large tank 10 which may hold an oxidizer such as gaseous or liquid oxygen. Mounted below tank 10 is a second tank 11 which holds a fuel, either gas or liquid. A third tank 12 may be mounted on the other side of the assembly and may hold other gases or fluids such as nitrogen for pressurizing the liquid fuel. The light source itself 13 is mounted directly below tank 10 and may be positioned between two reflectors 14 and 15. The reflectors help to intensify the light directed downwardly and they form a barrier which prevents the light source 13 from illuminating the airborne vehicle which is supporting the source. A lens 16 may be mounted below the reflectors, but this is not always necessary and may be omitted. Two or more supports 17 and 18 may be secured to tank 10 for supporting the arrangement on the ground prior to being airborne. One or more brackets 20 and 21 are secured to the tank 10 for support by cable 22 when the device is lowered from an airplane or helicopter during flight.

FIG. 3 shows the preferred arrangement whereby a light source 23 is provided with the three tanks 10, 11 and 12 housed within a compartment 24 having a control panel 25 for operation by an operator within the aircraft. The housing 24 is supported in the aircraft and is connected to the light source 23 by means of a cable 26, this cable including flexible conduits for transmission of the gases (or liquids, or both) and an electric transmission line for providing the spark plug with electrical energy for igniting the gas mixture.

FIG. 4 shows a combustion chamber or envelope in the form of four axially aligned fused quartz cylinders 28a, b, c and d, with an added layer of material which gives added brightness to the interior surface of the cylinder when heated to the appropriate temperature. This additional layer 27 may be quite thin and the material added may be diffused into the quartz. One such material is calcium oxide which gives a brilliant white light when heated to its emissive temperature. Many other materials, including sodium oxide, cerium oxide and thorium oxide, are available for deposition on the inside surface of the quartz cylinder. Some of these oxides produce a color which is predominant in other spectral emission regions. Layer 27 is deposited on the inner surface of the inner composite envelope 28.

Disposed along and coaxial with the longitudinal axis of envelope 28 is graphite rod or pintle 51. The rod in this embodiment is shown solid and in any transverse cross-section the external circumference of rod 51 is concenntric with the internal circumference of combustion chamber envelope 28. Clearly a hollow graphite rod may be used and is sometimes desirable because of ease in fabrication and saving in weight.

Referring now to FIG. 5, the detailed construction of the light source is shown. The inner quartz cylinder 28 comprising cylindrical segments 28a, b, c and d, is shown with a layer of added oxide material 27. Surrounding this composite tube 28 is a single integral outer tube 30, also of fused quartz, which is designed to be a permanent transparent retaining tube. The inner composite tube 28, because of the high temperatures applied to it may crack. Clearly, the physical discreteness of the segments tends to ensure disparate fissure or cracking patterns among the segments.

The exit end of the quartz tube is surrounded by a block of metal 31 forming a downstream support flange. An added liner 32 of refractory material such as graphite or tantalum tungsten alloy is mounted adjoining tube 28 and contains a plurality of tapered nozzles 33 disposed circumferentially about linear 32 which permit the burned compounds to escape into the atmosphere. At the other end of the tube 28 a block 41 forming an upstream support flange, includes a mixing chamber 34 where the fuel and the oxidizer gases or liquids are mixed or vaporized, or both, and then discharged into the interior of envelope 28 where they are ignited and burn. The graphite pintle 51 is tapered at its left hand end to provide for smooth flow of combustion gases over it as they flow from left to right through combustion chamber 28. The right hand end of pintle 51 is firmly supported in a receiving aperture in liner 32. The mixing chamber 34 is connected by a first conduit 35 to a tank containing fuel fluid. A solenoid valve 36 is mounted in series with conduit 35 so as to open or close the supply line to the mixing chamber. In a similar manner, conduit 37 supplies the oxidizing fluid to the mixing chamber in series with a solenoid operated fuel valve 38.

The downstream flange 31 and the upstream flange 41 are mounted on etiher ends of the combustion tube 28 and may be clamped together by any suitable means such as bolts 40. The mixing chamber and the valves 36, 38 are all mounted in a recess in terminal block 41. An expendable washer 44 of heat insulation is placed between the ends of the quartz cylinders and block 41. Clearance may be allowed between the outside diameter of composite tube 28 and the internal diameter of outer tube 30 to accommodate the thermal expansion of segments 28a, b, c and d and any dimensional variation in those segments due to manufacturing tolerances. Similarly, axial clearance may be provided along the direction of the longitudinal axis of composite tube 28 between any adjacent segments, or the end segments and their adjacent flanges, or both.

Appropriate seals, not shown, are provided, in manner well known to those of skill in the art, to prevent the escape of combustion gases. These may be located, for example, in, on, or between flanges 31 and 41 and their respective contact zones on tube 30.

The operation of this type of light source is as follows: after being lowered from the aircraft, the valves 36 and 38 are opened by remote control and a mixture of inflammable gas delivered to the combustion chamber defined by the inner-surface 27. At this point current is applied to the high tension coil 42 and the spark electrode 43 and a spark jumps across the gap to ignite the combustible mixture in chamber 34. This flame raises the temperature of the inside surface of composite tube 28 and causes the quartz cylinder to light up. If an inner layer 27 is used it also becomes incandescent. The burned gases pass from their point of ignition around and along pintle 51 and then are ejected through the exit nozzles 33. This action provides a brilliant white light which may be applied to any large land area. In producing an incandescent temperature for lighting up the quartz or the added layer, or both, the quartz may crack or become soft and may be deformed. The outer cylinder 30 is designed to supplement the inner cylinder and to act as a structural member.

The advantageous operation of pintel 51, from the theoretical viewpoint presented below, is due to its effect on the heat radiated away from the inner surface of envelope 28 and through and out of envelope 30. For a given gas temperature, the only effective way from a light enhancement viewpoint, to drive the inside surface of the quartz envelope 28 to higher temperatures is to increase the gas side coefficient of heat transfer. The equation for the heat transfer coefficient is:

$$h_c = 584 \frac{g^{0.8}}{d^{0.2}} \text{ B.t.u./hr./sq. ft./}^\circ \text{F.}$$

where $g$ is the flow rate per unit cross sectional area (lb./sq. in./sec.), $d$ is the passage diameter (inches). For a flowrate of 0.5 lb./sec. and a diameter of 5 inches (an actual dimension in one reduction to practice), then:

$$h_c = 584 \frac{0.5^{0.8}}{5.0^{0.2}} = 22.5 \text{ B.t.u./sq. ft./hr./}^\circ \text{F.}$$

This figure may readily be increased by a decrease in cross-sectional area or a decrease in $d$, something which is easily done by inserting pintle 51 in envelope 28. The gas flow passage then is annular. For annular passageways $d$ is replaced by an equivalent diameter $d_e$ which equals the difference in the diameters of the inside of the quartz cylinder 28 and the pintle 51, i.e., $d_e = d_2 - d_1$.

For a pintle of 3 inches diameter which leaves a one inch annular gap in a 5 inch internal diameter tube, $h_c = 38.4$ B.t.u./sq. ft./hr./° F., and, for a four inch plug, leaving an annular gap of 0.5 inch, $h_c = 70.5$ B.t.u./hr./sq. ft./° F. With a 4.5 inch diameter plug, leaving an annular gap of only 0.25 inch, $h_c = 343$ B.t.u./hr./sq. ft./° F. The required heat may be transferred to the quartz from the hot gas in this way provided a small gap is maintained.

From the above discussion, it is clear that any physical device which decreases the cross-sectional area is appropriate. The practical requirement is that the pintle survive the heat of operation of the light source. Refractory materials, such as graphite, are appropriate. Ablative materials which survive the requisite finite operation internal of the light source also may be used, as may be constructions using ordinary materials such as steel or copper with cooling provided by the fuel and oxidizer fluids prior to combustion, or by supplementary coolants such as water.

The foregoing disclosure and drawings are merely illustrative of the principles of this invention and are not to be interpreted in a limiting sense.

What I claim as my invention, is:

1. An incandescent light source, comprising:
   (a) an envelope of material having a boiling point in excess of 5000° F.;
   (b) means for introducing and sustaining burning gases in an input region of the envelope, said envelope being closed at said input region except for said means, and said envelope comprising a wall portion adjacent the path of said burning gases to be intensely heated thereby;
   (c) an exhaust opening at an exhaust region of the envelope for exhausting the burning gases; and
   (d) physical means attached to said envelope away from said first-named means and disposed between the input and exhaust regions for decreasing, before said wall portion and said physical means, a portion of the transverse cross-sectional areas transverse to the direction of burning gas flow from the input to the exhaust regions, whereby all of the burning gas flow passes through said decreased portion.

2. An incandescent light source as recited in claim 1 wherein the envelope material is optically transparent.

3. An incandescent light source as recited in claim 1 wherein said transverse cross-sectional area decreasing means is a rod having one end secured to a mounting member connected to the envelope at the exhaust region with the rod extending through the envelope void toward the input region.

4. An incandescent light source as recited in claim 3 wherein said rod is of graphite.

5. An incandescent light source as recited in claim 3 wherein the other end of said rod is tapered from a wider to a narrower transverse cross-sectional area in the direction from the exhaust region to the input region.

6. An incandescent light source as recited in claim 2 wherein said envelope is a first elongated tubular member, and including a second elongated tubular member of optically transparent material having a boiling point in excess of 5000° F. surrounding and coaxial with the first tubular member.

7. An incandescent light source as recited in claim 6 wherein the first and second elongated tubular members are of fused quartz.

8. An incandescent light source as recited in claim 6 wherein the first elongated tubular member is a composite of a plurality of axially aligned tubular segments.

9. An incandescent light source as recited in claim 8, including a graphite pintle secured in a mounting member connected to the envelope at the exhaust region of the composite tubular member and extending coaxially through the composite tubular member.

10. An incandescent light source as recited in claim 8, including means coupled to the internal surfaces of the composite tubular member for increasing the spectral emissivity in the visible region of the incandescent light source.

11. An incandescent light source as recited in claim 8 wherein the plurality of axially aligned segments are of fused quartz and have internal surfaces doped with material which enhances spectral emissivity in the visible region when heated above 4000° F.

12. An incandescent light source as recited in claim 10 including a solid graphite pintel secured in a mounting member connected to the envelope at the exhaust region of the composite tubular member and extending coaxially through the composite tubular member.

13. An incandescent light source, comprising:
(a) an internal elongated composite tubular member of optically transparent material having a boiling point in excess of 5000° F., said composite member comprising a plurality of axially aligned tubular segments;
(b) means for introducing and sustaining burning gases in an input end of the internal tubular member;
(c) exhaust means at an exhuast end of the internal tubular member for exhausting the burning gases; and
(d) an external elongated tubular member of optically transparent material having a boiling point in excess of 5000° F. surrounding and coaxial with the internal composite member.

14. An incandescent light source as recited in claim 13 wherein the internal and external members are of fused quartz.

References Cited
UNITED STATES PATENTS

| | | | |
|---|---|---|---|
| 250,089 | 11/1881 | Lungren | 67—89 |
| 288,281 | 11/1883 | Warne | 67—89 |
| 808,513 | 12/1905 | Cox | 67—88 X |
| 904,627 | 11/1908 | Lovekin | 110—97 X |
| 3,141,741 | 7/1964 | Hoel et al. | 431—4 X |

EDWARD G. FAVORS, Primary Examiner

U.S. Cl. X.R.

110—97; 431—4, 126